United States Patent Office 2,793,953
Patented May 28, 1957

2,793,953
METHOD FOR REPLACING CATIONS IN MILK

Ching C. Loo, Sepulveda, Calif., assignor to Carnation Company, Los Angeles, Calif., a corporation of Delaware No Drawing. Application March 1, 1954,
Serial No. 413,465

15 Claims. (Cl. 99—54)

The present invention relates to the manufacture of a milk product in which one of the metal elements of milk has been either completely removed or considerably reduced in content. More specifically, the present invention relates to a method for manufacturing a milk product having a low sodium content.

Quite recently the use of low sodium diets has been found to be beneficial in the treatment of hypertension, and in the treatment of other illnesses requiring diets of low sodium content. The method of the present invention for manufacturing a milk product of this type provides a product which is highly palatable, in which the sodium content of the original milk has been almost completely removed, and in which the remaining calcium and potassium of the original milk are still present in substantially their original proportions.

It has been found that when fresh milk is contacted with the potassium form of a cation exchange resin that the sodium is replaced with potassium ions so that the treated milk contains none or very little sodium. It has also been found that the calcium, magnesium and some other cations in the fresh milk are to a great extent replaced by potassium ions so that the content of calcium, magnesium and the other cations of the treated milk is considerably lower than the content of calcium, magnesium and the other cations of fresh milk. The potassium ion concentration of the treated milk accordingly is considerably greater than the potassium content found in fresh milk. The minerals in the treated milk can then be readjusted so as to increase the calcium content of the milk and decrease the potassium content of the milk by treating the milk with a second cation exchange resin in both its calcium form and hydrogen form. This briefly describes applicant's improved method and the same will be more fully understood and appreciated upon perusal of the following description.

As cation exchange materials there may be used any of the exchangers which are capable of existing in the form of metal salts or in the acid form. Typical of the cation exchangers are resins such as those prepared by sulfonation of polystyrene resins. A typical high capacity resin which by experimentation has been found to be highly effective for absorbing the metal ions in milk is nuclear sulfonic polystyrene. The potassium form of this particular resin is prepared by passing through a bed of the resin contained in a column 2.9 ml. of 10% potassium chloride solution per ml. of resin at a flow rate of approximately .13 ml. solution per ml. of resin per minute and subsequently rinsing the resin with distilled water.

The calcium form of this particular cation exchange resin is prepared in the same manner as the potassium form except that 2.3 ml. of 10% calcium chloride solution is passed through the resin per ml. of resin.

The hydrogen form of this particular resin is also prepared in substantially the same manner as the potassium form except that one ml. of 10% hydrochloric acid is passed through the resin per ml. of the resin.

As previously mentioned, sodium ions are those which it is primarily desired to replace. However, a rather large proportion of the calcium ions is also taken up and the potassium ion concentration is greatly increased when the fresh milk is subjected to its first treatment with the potassium form cation exchange resin. The contact of the treated milk with the calcium form and hydrogen form cation exchange resins restores in the milk calcium and potassium to levels substantially equal to that found in untreated milk.

An example of the treatment of milk by applicant's method is readily illustrated by the following typical procedure.

A stainless steel column which is 2½ inches in diameter and 48 inches long was packed with three liters of potassium form polystyrene nuclear sulfonic acid cation exchange resin and homogenized pasteurized fresh whole milk was pumped at a rate not faster than 600 ml. per minute downward through this bed of resin. The first two liters of effluent milk from the column were discarded, the milk coming out after that being collected until its pH value dropped by $\frac{2}{10}$. The usual pH value of the initial effluent milk was about 7.3. The effluent milk, therefore, was collected up to the moment its pH value dropped to 7.1. Approximately 7 gallons of this effluent milk were obtained from this one column and this treated milk was high in potassium and low in all other metal cations, sodium being eliminated almost completely.

The high potassium treated milk was then mixed vigorously and continuously in a vessel for five minutes, with about 7% of its weight of an 11–1 mixture of calcium form and hydrogen form polystyrene nuclear sulfonic acid exchange resin, this calcium form and hydrogen form resin being prepared in the previously described manner. At the end of approximately 5 minutes, the pH of the milk was about the same as the pH of the original fresh milk and the milk was decanted off through a strainer to remove the resin particles. The purpose of this step is to reduce the potassium ion concentration and to restore calcium ions so that the milk product will contain approximately the same amounts of potassium and calcium as found in fresh untreated whole milk.

The milk so treated can be either pasteurized and bottled or canned and sterilized as low sodium milk. It has been found that this method is capable of reducing sodium in milk from approximately 600 parts per million to approximately 30 parts per million without substantial detrimental flavor or taste effects. It will be appreciated that the principles of the present invention are also effective for removing or reducing the sodium content of skimmed milk, reconstituted milk, and milk having the water content thereof partially removed as well as whole milk.

It will be appreciated, therefore, that the method of the present invention consists of two main steps. The first step involves the replacement of sodium ions and most of the other cations such as calcium with potassium ions. The second step involves the restoration of calcium ions and a partial reduction of potassium ions which resulted from step one.

I claim:

1. A two-step cation exchange process for replacing sodium in milk with other metal cations which comprises bringing together the milk with a cation exchange resin in its potassium form, thereby replacing the sodium with potassium ions, and then contacting the treated milk with a cation exchange resin in its calcium form for increasing the calcium content of the treated milk to substantially the concentration found in the untreated milk.

2. A two-step cation exchange process for replacing sodium in milk with other metal cations which comprises contacting the milk with a sulfonated polystyrene cation exchange resin in its potassium form, thereby replacing sodium with potassium ions while substantially reducing the calcium ion content of the treated milk, reconstituting the calcium ion content of the treated milk by contacting the treated milk with a sulfonated polystyrene cation exchange resin in its calcium form for increasing the calcium ion content to substantially the concentration found in the untreated milk.

3. A two-step cation exchange process for replacing sodium in milk with other metal cations which comprises bringing together the milk and a cation exchange resin in its potassium form, thereby replacing the sodium with potassium ions, contacting the treated milk with a mixture of cation exchange resins of both the calcium form and hydrogen form for increasing the calcium content of the treated milk and decreasing the potassium content of the treated milk, thereby re-establishing approximately the natural concentrations of calcium and potassium in the treated milk.

4. A two-step cation exchange process for replacing sodium in milk with other metal cations which comprises contacting the milk with a sulfonated polystyrene cation exchange resin in its potassium form, thereby replacing sodium with potassium ions, reconstituting the metal content of the treated milk by contacting the treated milk with sulfonated polystyrene cation exchange resin in both its calcium form and its hydrogen form for increasing the calcium ion content and decreasing the potassium ion content to substantially the concentration found in said milk.

5. A two-step cation exchange process for replacing sodium in milk with other metal cations which comprises passing the milk through a bed of cation exchange resin in its potassium form, thereby replacing the sodium with potassium ions, mixing the treated milk with a mixture of cation exchange resins of both the calcium and hydrogen form, until the pH of the treated milk is the same as the pH of the original untreated milk for increasing the calcium content of the milk and decreasing the potassium content of the treated milk, thereby re-establishing approximately the natural concentrations of calcium and potassium in the treated milk.

6. A two-step cation exchange process for replacing sodium in milk with other metal cations which comprises passing the milk downflow through a bed of cation exchange resin in its potassium form, thereby replacing the sodium with potassium ions, mixing the treated milk with a mixture of cation exchange resins of both the calcium form and hydrogen form for increasing the calcium content of the treated milk and decreasing the potassium content of the treated milk, thereby re-establishing approximately the natural concentrations of calcium and potassium in the treated milk.

7. A two-step cation exchange process for replacing sodium in milk with other metal cations which comprises passing the milk through a bed of cation exchange resin in its potassium form, thereby replacing the sodium with potassium ions, mixing the treated milk with an 11-1 mixture of calcium form and hydrogen cation exchange resins for increasing the calcium content of the treated milk and decreasing the potassium content of the treated milk to substantially the concentration found in said milk.

8. A two-step cation exchange process for replacing sodium in milk with other metal cations which comprises passing the milk through a bed of cation exchange resin in its potassium form, thereby replacing the sodium with potassium ions, mixing the treated milk with approximately 7% of its weight of an 11-1 mixture of calcium form and hydrogen cation exchange resins until the pH of the treated milk is the same as the pH of the original untreated milk for increasing the calcium content of the treated milk and decreasing the potassium content of the treated milk, thereby re-establishing approximately the natural concentrations of calcium and potassium in the treated milk.

9. A two-step cation exchange process for replacing sodium in milk with other metal cations which comprises pumping the milk downflown through a column of cation exchange resin in its potassium form and collecting the treated milk until the moment its pH drops by approximately two-tenths below that of the initial effluent from the column, thereby replacing the sodium with potassium ions, vigorously mixing said treated milk with approximately 7% of its weight of an 11-1 mixture of calcium form and hydrogen form cation exchange resins for increasing the calcium content and decreasing the potassium content of the treated milk to substantially the concentration found in said milk.

10. A two-step cation exchange process for replacing sodium in milk with other metal cations which comprises passing the milk through a bed of potassium form sulfonated polystyrene cation exchange resin, thereby replacing the sodium with potassium ions, mixing the treated milk with a mixture of sulfonated polystyrene cation exchange resins of both the calcium and hydrogen form until the pH of the treated milk is the same as the pH of the original untreated milk, for increasing the calcium content of the milk and decreasing the potassium content of the treated milk, thereby re-establishing approximately the natural concentrations of calcium and potassium in the treated milk.

11. A two-step cation exchange process for replacing sodium in milk with other metal cations which comprises passing the milk downflow through a bed of potassium form sulfonated polystyrene cation exchange resin, thereby replacing the sodium with potassium ions, mixing the treated milk with a mixture of sulfonated polystyrene cation exchange resins of both the calcium form and hydrogen form for increasing the calcium content of the treated milk and decreasing the potassium content of the treated milk, thereby re-establishing approximately the natural concentrations of calcium and potassium in the treated milk.

12. A two-step cation exchange process for replacing sodium in milk with other metal cations which comprises passing the milk through a bed of potassium form sulfonated polystyrene cation exchange resin, thereby replacing the sodium with potassium ions, mixing the treated milk with an 11-1 mixture of calcium form and hydrogen form sulfonated polystyrene cation exchange resins for increasing the calcium content of the treated milk and decreasing the potassium content of the treated milk to substantially the concentration found in said milk.

13. A two-step cation exchange process for replacing sodium in milk with other metal cations which comprises passing the milk through a bed of potassium form sulfonated polystyrene cation exchange resin, thereby replacing the sodium with potassium ions, mixing the treated milk with approximately 7% of its weight of an 11-1 mixture of calcium form and hydrogen form sulfonated polystyrene cation exchange resins for increasing the calcium content of the treated milk and decreasing the potassium content of the treated milk, thereby re-establishing approximately the natural concentrations of calcium and potassium in the treated milk.

14. A two-step cation exchange process for replacing sodium in milk with other metal cations which comprises pumping milk downflow through a column of potassium form sulfonated polystyrene cation exchange resin and collecting the treated milk until the moment its pH drops to approximately 7.1, thereby replacing the sodium with potassium ions, vigorously mixing said treated milk with approximately 7% of its weight of 11-1 mixture of calcium form and hydrogen form sulfonated polystyrene cation exchange resin until the pH of the treated milk is approximately equal to the pH of the original untreated milk, for increasing the calcium content and decreasing the potassium content of the treated milk to substantially the concentration found in said milk.

15. A two-step cation exchange process for re-establishing approximately the natural concentration of calcium and potassium in a treated milk, the sodium content of said treated milk being almost entirely removed, the calcium content being substantially reduced and the potassium content being substantially increased with respect to the proportions that these elements are found in untreated milk, consisting of contacting the treated milk with a mixture of cation exchange resins of both the calcium form and hydrogen form for increasing the calcium content of the treated milk and decreasing the potassium content of the treated milk to substantially the concentrations found in untreated milk.

References Cited in the file of this patent

UNITED STATES PATENTS

| | | |
|---|---|---|
| 2,307,234 | Otting et al. | Jan. 5, 1943 |
| 2,346,844 | Hull | Apr. 18, 1944 |
| 2,511,825 | Myers | June 13, 1950 |
| 2,599,757 | Gottfried | June 10, 1952 |

OTHER REFERENCES

Industrial and Engineering Chemistry, vol. 35, No. 2, pages 186–192.